United States Patent
Boutillier et al.

(12)

(10) Patent No.: US 6,255,402 B1
(45) Date of Patent: Jul. 3, 2001

(54) HIGH-IMPACT VINYLAROMATIC POLYMER OBTAINED FROM A RUBBER BEARING A GROUP WHICH GENERATES A STABLE FREE RADICAL

(75) Inventors: Jean-Marc Boutillier; Nathalie Forges, both of Pau (FR)

(73) Assignee: Atofina (FR)

( * ) Notice: Subject to any disclaimer, the term of this patent is extended or adjusted under 35 U.S.C. 154(b) by 0 days.

(21) Appl. No.: 09/157,309

(22) Filed: Sep. 18, 1998

(30) Foreign Application Priority Data

Sep. 19, 1997 (FR) .................................................. 97 11693
May 29, 1998 (FR) .................................................. 98 06795

(51) Int. Cl.$^7$ .................................................. C08C 19/00
(52) U.S. Cl. ........................... 525/316; 525/87; 525/256; 525/259; 525/331.9; 525/333.2; 525/375; 525/376; 525/377; 525/904
(58) Field of Search ............................. 526/204; 525/314, 525/316, 259, 87, 331.9, 333.2, 375, 376, 377, 387, 904, 256

(56) References Cited

U.S. PATENT DOCUMENTS

| 4,493,922 | 1/1985 | Echte et al. . |
| 4,581,429 | 4/1986 | Solomon et al. . |
| 5,334,658 | 8/1994 | Blumenstein et al. . |
| 5,498,679 | 3/1996 | Moffat et al. ........................ 526/204 |
| 5,627,248 | 5/1997 | Koster et al. . |
| 5,721,320 | * 2/1998 | Priddy et al. ..................... 526/204 X |
| 5,919,871 | 7/1999 | Nicol et al. . |

FOREIGN PATENT DOCUMENTS

| 294 493 A5 | 10/1991 | (DE) . |
| 4440675 | 5/1996 | (DE) . |
| 0 048 389 A1 | 3/1982 | (EP) . |
| 0 048 389 B1 | 1/1985 | (EP) . |
| 732345 | 9/1986 | (EP) . |
| 460541 | 11/1995 | (EP) . |
| 0 726 280 A1 | 8/1996 | (EP) . |
| 0726289 | 11/1996 | (EP) . |
| WO94/11412 | 5/1994 | (WO) . |
| WO95/06686 | 3/1995 | (WO) . |
| WO 97/36944 | 10/1997 | (WO) . |
| WO 97/46593 | 12/1997 | (WO) . |

OTHER PUBLICATIONS

Fedoseeva, et al, "Radiolysis of Rubber in the Presence of . . . Stable Free Radicals", Khim. Vys. Energ. (1973), 7(1), 67–9.*

F. Haaf et al., "Structure and properties of rubber reinforced thermoplastic", J. Sci. Ind. Res., vol. 40, Oct. 1981, pp. 659–679.

A. Echte, "Robber–toughened stryrene polymers–a review", American Chemical Society, Washington, 1989.

D. Griller et al., "Persistent carbon–centered radicals", Accounts Of Chemical Research, vol. 9, pp. 13–19, 1976.

S. Kobatake et al., "Block Polymer Synthesis by Styrene Polymerization Initiated with Nitroxy–Functionalized Polybutadiene", Polym. Prepr. (Am. Chem. Soc., Div. Polym. Chem.) 38(2)1997.

* cited by examiner

*Primary Examiner*—Fred Teskin
(74) *Attorney, Agent, or Firm*—Pennie & Edmonds LLP

(57) ABSTRACT

The invention relates to a process for preparing a composition comprising a vinylaromatic polymer matrix and particles of rubber, which comprises a step of polymerizing at least one vinylaromatic monomer in the presence of a rubber comprising a group which generates a stable free radical. The process makes it possible to obtain morphologies other than salami morphologies, such as the labyrinth, onion or capsule morphology, with the aim, for example, of enhancing the gloss of the high-impact vinylaromatic polymer.

29 Claims, No Drawings

HIGH-IMPACT VINYLAROMATIC POLYMER OBTAINED FROM A RUBBER BEARING A GROUP WHICH GENERATES A STABLE FREE RADICAL

BACKGROUND OF THE PRESENT INVENTION

1. Technical Field

The invention relates to a process for preparing a high-impact vinylaromatic polymer composition, in other words a composition comprising a matrix of vinylaromatic polymer and particles of rubber.

According to the prior art, the particles of rubber can be in various morphologies. The following morphologies may be obtained:

- the "salami"-type morphology, which means that the rubber particle contains a number of occlusions, generally substantially spherical but not concentric, of vinylaromatic polymer,
- the "labyrinth"-type morphology, which means that the rubber particle contains a number of elongated, curved, generally aspherical and generally asymmetric occlusions of vinylaromatic polymer,
- the "onion"-type morphology, which means that the rubber particle is substantially spherical and contains, concentrically with respect to itself, a number of occlusions of vinylaromatic polymer contained within one another,
- the "capsule"-type morphology, which means that the rubber particle, which is generally substantially spherical, contains a single occlusion of vinylaromatic polymer.

The salami, labyrinth and onion morphologies can be termed "multi-occlusion" morphologies. They are generally substantially larger than is the capsules.

These morphologies affect the impact properties and the gloss of vinylaromatic polymer compositions. The influence of this morphology on the gloss, in increasing order of gloss, is as follows: salami, then labyrinth or onion, then capsule.

In general, the greater the occlusion content of a particle the larger it is. This is why the rubber particles generally increase in size in the following order: capsule, then labyrinth or onion, then salami. It is for this reason that it is possible to consider the possibility of enhancing the gloss of a high-impact vinylaromatic polymer composition by reducing the size of the particles of rubber it contains.

Depending on the target properties of the material, especially its impact resistance and gloss, one may be led to combine within the same material particles having different morphologies and, for example, to adjust the capsules/multi-occlusions ratio. In particular, a material whose mass of rubber particles consists predominantly of capsules and in which the remainder of the mass of particles, for example from 5 to 40%, consists of multi-occlusions exhibits a good tradeoff between impact and gloss.

If the desire is to obtain a particularly glossy high-impact vinylaromatic copolymer or polymer, one may be led to research the preparation conditions which lead exclusively to the capsule morphology.

2. Description of Related Art

According to the prior art, the morphologies other than the salami morphology, in other words the labyrinth, onion or capsule morphologies, cannot be obtained by making use of a conventional polydiene but only by polymerizing the vinylaromatic monomer in the presence of a styrenebutadiene copolymer. In particular, in accordance with the prior art, the capsule morphology would only be obtainable by polymerizing styrene in the presence of a styrene-butadiene copolymer comprising at least 15 and 15 preferably 40% styrene. This teaching results in particular from the following documents:

Echte et al., J. Sci. Ind. Res. 40, 659 (1981),

EP 48389

Echte, Rubber Toughened Plastics, C. Keith Riew Editor, American Chemical Society, Washington, 1989.

However, such copolymers are expensive and, moreover, must be introduced into the polymerization medium in higher concentrations than a conventional polydiene for a given level of polydiene in the final high-impact vinylaromatic composition. Such amounts of copolymer are, moreover, liable to require longer periods of solubilization within the styrene prior to polymerization. For this reason it is desirable to know how to obtain a capsule, onion or labyrinth morphology while making use of a conventional, less expensive rubber which can be introduced in a smaller quantity into the polymerization medium.

The desired capsules/multi-occlusions ratio for a given material can, for example, be obtained by mixing defined amounts of a high-impact vinylaromatic polymer containing only capsules and a high-impact vinylaromatic polymer containing only particles of the multi-occlusion type.

The patent application EP 0726280 teaches that it is possible to prepare a high-impact polystyrene by polymerizing styrene in the presence of a rubber and a stable free radical. However, in the practical examples of this document, the final material does not include any capsule particles. The practical examples of that document teach that the presence of the stable free radical during polymerization may lead to an increase in the size of the rubber particles within the end material.

SUMMARY OF THE INVENTION

The present invention relates to a process for preparing a composition comprising a vinylaromatic polymer matrix and particles of rubber, the said process comprising a step of polymerizing at least one vinylaromatic monomer in the presence of a rubber comprising a group which generates a stable free radical.

The process according to the invention makes it possible to obtain morphologies other than salami morphologies, such as the labyrinth, onion or capsule morphology, with the aim, for example, of enhancing the gloss of the high-impact vinylaromatic polymer.

DESCRIPTION OF THE PREFERRED EMBODIMENTS

The process according to the invention provides a solution for obtaining morphologies different from the salami morphology with the aim, for example, of increasing the gloss of the high-impact vinylaromatic polymer without it being necessary to employ a styrene-butadiene copolymer, by employing a homopolybutadiene. However, the use of a styrene-butadiene copolymer is not ruled out since there may be a desire to combine the advantage of the use of such a copolymer and the advantage of the fact that such a copolymer carries a group which generates a stable free radical. Such a combination makes it possible to use a rubber which carries fewer groups which generate a stable free radical than if the rubber were to be derived from a polybutadiene devoid of units of styrene as comonomer.

By morphology other than the salami morphology is meant at least one of the labyrinth, onion or capsule morphologies, or their combinations, also including if appropriate their combination within the same material with particles of the salami type. The process according to the invention may lead to a composition comprising a high proportion of capsules.

The process according to the invention comprises a step of polymerizing at least one vinylaromatic monomer in the presence of a rubber comprising a group which generates a stable free radical, referred to hereinafter as carrier rubber.

The carrier rubber is prepared prior to the polymerization of the vinylaromatic monomer.

In general, the process according to the invention leads to an end material whose rubber particles have a lower average size in comparison with a process which employs a conventional rubber which does not carry a group which generates stable free radicals, under otherwise comparable operating conditions.

The carrier rubber may be obtained, for example, by a process including a step of heat treatment of an elastomer conventionally used for the preparation of high-impact vinylaromatic polymers, in the presence of a stable free radical, of a free-radical initiator which is capable of withdrawing a proton from the elastomer, and of a solvent and in the absence of vinylaromatic monomer. Such an initiator can be selected, for example, from the list of polymerization initiators proposed below for use in the polymerization according to the invention. The initiator is preferably selected from the following list:

tert-butyl isopropyl monoperoxycarbonate,
tert-butyl 2-ethylhexyl monoperoxycarbonate,
dicumyl peroxide,
di-tert-butyl peroxide,
1, 1-di (ttert-butylperoxy) cyclohexane,
1, 1 -di (tert-butylperoxy)-3,3, 5-trimethyl- cyclohexane,
tert-butyl peroxyacetate,
cumyl tert-butyl peroxide,
tert-butyl peroxybenzoate and
tert-butyl peroxy-2-ethylhexanoate.

The operating conditions relating to this heat treatment, namely the nature and quantity of the ingredients used, temperature and duration must preferably be such that the rubber obtained carries on average from 0.1 to 10 groups which generate a stable free radical per rubber chain.

If the presence of capsules is desired in the end material, it is preferable for the rubber to carry on average from 0.5 to 2 and, more preferably, from 0.5 to 0.9 groups which generate a stable free radical per rubber chain. In this case, the person skilled in the art is capable of researching those operating conditions for the heat treatment of the elastomer which lead to a rubber which carries on average from 0.5 to 2 or from 0.5 to 0.9 groups which generate a stable free radical per rubber chain.

If the stable free radical which has been used is bifunctional, i.e., possesses the radical state at two different sites in its molecule, as is the case, for example, for:

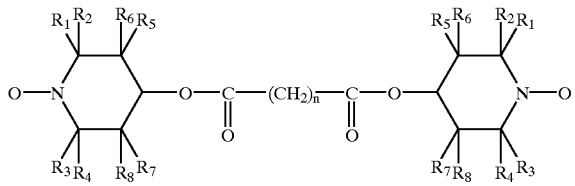

and if the heat treatment has been effective, such that each molecule of this stable free radical is joined to two elastomer chains, the assembly formed by the two elastomer chains and the bifunctional, stable free radical molecule is considered to be a rubber carrying on average 1 group which generates a stable free radical per rubber chain.

This approach can of course be generalized whatever the functionality of the stable free radical.

The heat treatment is preferably carried out such that the free-radical initiator has maximum efficacy; in other words, such that each free radical that it is capable of generating effectively withdraws one proton from the elastomer. These conditions are substantially met if the temperature of heat treatment is between ($T^{1/2}$–50° C.) and ($T^{1/2}$+50° C.), where $T^{1/2}$ represents the temperature at which the half-life of the initiator is one hour. Preferably, in order not to degrade the elastomer by crosslinking, heat treatment is carried out at below 150° C. Heat treatment is preferably carried out at more than 50° C.

The initiator is preferably chosen such that the temperature at which its half-life is one hour is between 90 and 150° C.

The following meanings are assigned to the symbols below:

(SFR): the number of moles of stable free radical,
$F_{SFR}$: the functionality of the stable free radical, i.e., the number of sites on the same stable free radical molecule which exhibit the stable free radical state,
(INIT): the number of moles of free-radical initiator,
$F_{INIT}$: the functionality of the free-radical initiator, i.e., the number of free radicals which each molecule of initiator is capable of generating, and
(ELAST): the number of moles of elastomer; then, generally, the ingredients required for the heat treatment are introduced such that $$\frac{F_{INIT} \times (INIT)}{F_{SFR} \times (SFR)} \text{ is between 0.1 and 10,}$$

Also, generally, the ingredients required for the heat treatment are introduced such that $$\frac{(ELAST)}{(SFR) \times F_{SFR}} \text{ is between 0.1 and 10.}$$

The solvent can be selected, for example, from aromatic solvents, such as toluene, benzene and ethylbenzene, or alicyclic solvents, such as cyclohexane. The amount of solvent is preferably sufficient for the medium containing all of the ingredients required for the heat treatment to be homogeneous. By way of example, the solvent can generally be present in a proportion of from 25 to 95% by weight.

Once it has been prepared, the rubber can be isolated as for a conventional rubber; for example, by precipitation from methanol followed by filtration and drying, and then stored. Drying can be carried out at atmospheric pressure or under vacuum at, for example, from room temperature to 150° C. and, more particularly, from room temperature to 60° C.

It is also possible, however, not to isolate the rubber but to introduce it as it is into the polymerization medium of the process according to the invention for obtaining a high-impact vinylaromatic polymer.

During the polymerization step of the process according to the invention the carrier rubber liberates the stable free radical such that units of vinylaromatic monomer can be inserted between the rubber chain and the stable free radical. The rubber carries sufficient groups which generate stable free radicals to influence substantially the morphology of the particles during the polymerization step.

When the average proportion of groups which generate stable free radicals per rubber chain is increased, there is first of all an increase in the opportunities for formation of labyrinths or onions and then, when this proportion is increased further, there is an increase in the opportunities for formation of capsules.

The rubber preferably comprises an average of from 0.1 to 10 generating groups per rubber chain. This is an average figure, and it would not be departing from the scope of the present invention, for example, to polymerize a vinylaromatic monomer in the presence of two polybutadienes only one of which were to carry groups which generate stable free radicals. If the presence of capsules in the end material is desired, it is preferable for the rubber to comprise on average from 0.5 to 2 and, more preferably, from 0.5 to 0.9 groups which generate a stable free radical per rubber chain.

A stable free radical should not be confused with the free radicals whose life is ephemeral (a few milliseconds), such as the free radicals produced by customary polymerization initiators such as peroxides, hydroperoxides and azo-type initiators. The free radicals which initiate polymerization have a tendency to accelerate the polymerization, whereas stable free radicals tend generally to slow it down.

Generally speaking, a stable free radical can be isolated in the radical state at ambient temperature. A stable free radical is sufficiently stable for its free radical state to be characterizable by spectroscopic methods.

It is recalled that the concept of a stable free radical is known to the person skilled in the art to denote a radical which is sufficiently persistent and inert towards the air and the humidity in ambient air that the pure radical can be handled and stored at room temperature without any more precautions than for the majority of commercial chemical products (in this regard see D. Griller and K. Ingold, Accounts of Chemical Research, 1976, 9, 13–19, or Organic Chemistry of Stable Free Radicals, A. Forrester et al., Academic Press, 1968).

The class of stable free radicals includes, in particular, the compounds acting as inhibitors of radical polymerization, the stable nitroxide radicals, i.e., those comprising the group =N—C. As stable free radical it is possible to use, for example, the radicals represented by the following formulae:

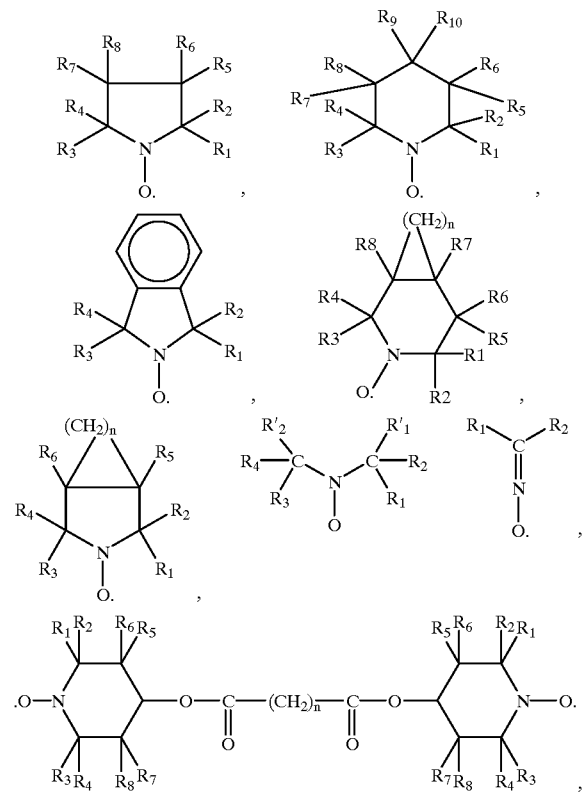

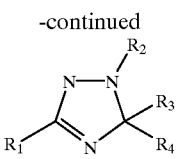

in which R1, R2, R3, R4, R'1 and R'2 can be identical or different, and represent a halogen atom, such as chlorine, bromine or iodine, a saturated or unsaturated, linear, branched or cyclic hydrocarbon group, such as an alkyl or phenyl radical, or an ester group —COOR or an alkoxy group —OR, or a phosphonate group —PO(OR)$_2$, or a polymer chain which can be, for example, a polymethyl methacrylate chain, a polybutadiene chain, a polyolefin chain, such as a polyethylene or polypropylene chain, but is preferably a polystyrene chain, and in which R5, R6, R7, R8, R9 and R10, which can be identical or different, can be selected from the same set of groups as has just been envisaged for R1, R2, R3, R4, R'1 and R'2 and, in addition, may represent a hydrogen atom, a hydroxyl group —OH or an acid group, such as —COOH or —PO(OH)$_2$ or —SO$_3$H.

In particular, the stable free radical can be 2,2,5,5-tetramethyl-1-pyrrolidinyloxy, marketed under the trade name PROXYL, or 2,2,6,6-tetramethyl-1-piperidinyloxy, generally marketed under the name TEMPO.

The stable free radical may also be selected from the following list:

N-tert-butyl-1-phenyl-2-methylpropyl nitroxide,
N-tert-butyl-1-(2-naphthyl)-2-methylpropyl nitroxide,
N-tert-butyl-1-diethylphosphono-2, 2-dimethyl-propyl nitroxide,
N-tert-butyl-1-dibenzylphosphono-2, 2-dimethylpropyl nitroxide,
N-phenyl-1-diethylphosphono-2, 2-dimethyl-propyl nitroxide
N-phenyl-1-diethylphosphono-1-methylethyl nitroxide
N-(1-phenyl-2-methylpropyl)-1-diethyl-phosphono-1-methylethyl nitroxide,
4-hydroxy-2, 2, 6, 6-tetramethyl-1-piperidinyloxy,
4-oxo-2, 2, 6, 6-tetramethyi-1-piperidinyloxy,
2, 4, 6-tri-tert-butylphenoxy.

Apart from the presence of the stable free radical, the other ingredients employed, and the synthesis conditions, are those commonly employed for the preparation of high-impact vinylaromatic polymer compositions.

By way of example, the medium for polymerization in the step of the process according to the invention may comprise:

per 100 parts by weight of vinylaromatic monomer
from 2 to 35 parts by weight of carrier rubber and
from 0 to 50 parts by weight of solvent.

By vinylaromatic monomer is meant styrene, styrene substituted on the vinyl group by an alkyl group, such as alpha-methylstyrene or alpha-ethylstyrene, styrene substituted on the ring by an alkyl group, such as ortho-vinyltoluene, para-vinyltoluene, ortho-ethylstyrene, 2, 4-dimethylstyrene, styrene substituted on the ring by a halogen, such as 2, 4-dichlorostyrene, styrene substituted both by a halogen and an alkyl group, such as 2-chloro-4-methylstyrene, and vinylanthracene. Styrene is a preferred vinylaromatic monomer.

The carrier rubber is obtained from an elastomer which has been modified to give it a group which generates a stable free radical.

By elastomer is meant those commonly employed to improve the impact properties of vinylaromatic polymers.

These are commonly conjugated polydienes, such as polybutadiene (including homopolybutadiene), polyisoprene, and elastomeric styrene-butadiene copolymers, which are also called SBR (styrene-butadiene rubber).

The elastomer generally has a number-average molecular mass of from 50,000 to 350,000 and a weight-average molecular mass of from 100,000 to 500,000. The same is true of the carrier rubber.

The polymerization medium may also include at least one organic solvent. The latter is chosen such that it does not boil under the polymerization conditions and such that it is miscible with the vinylaromatic monomer and with the vinylaromatic polymer derived from it. It is possible to use alicyclic hydrocarbons, such as cyclohexane, or, preferably, aromatic compounds, such as toluene, benzene, ethylbenzene or xylene.

The polymerization medium may additionally include at least one monomer which is copolymerizable with the vinlyaromatic monomer or monomers, such as, for example, at least one acrylic or methacrylic monomer, or acrylonitrile.

It is also possible to add at least one adjuvant or polymerization initiator, which are customary for this type of preparation, to the polymerization medium, before or during polymerization. These adjuvants can be plasticizers, such as mineral oils, butyl stearate or dioctyl phthalate, stabilizers, such as antioxidants, which can be phenol substituted by an alkyl group, such as di-tert-butyl-para-cresol, or phosphites, such as trinonylphenyl phosphite.

If a plasticizer is introduced this can be done in an amount such that it is present in the composition which is finally synthesized in a proportion of from 0 to 6% by weight.

If a stabilizer is introduced, it can be present in the polymerization medium in a proportion of from 0 to 3000 ppm.

The polymerization reaction can be initiated thermally, without either polymerization initiator or catalyst, or can be initiated by a polymerization initiator. If polymerization is initiated thermally, it can be carried out at between 100 and 200° C. and, preferably, between 110 and 160° C.

If polymerization is initiated by a polymerization initiator, it can be carried out at between 50 and 200° C. and, preferably, between 90 and 160° C. The polymerization initiator can be selected from organic peroxides and hydroperoxides, such as dibenzoyl peroxide, tert-butyl peroxybenzoate, 1, 1-bis (tert-butylperoxy) cyclohexane, or azo compounds, such as azobisisobutyronitrile. The polymerization initiator may also be selected from the following list:

- tert-butyl isopropyl monoperoxycarbonate,
- tert-butyl 2-ethylhexyl monoperoxycarbonate,
- dicumyl peroxide,
- di-teri-butyl peroxide,
- 1, 1-di (tert-butylperoxy)cyclohexane,
- 1, 1-di(tert-butylperoxy)-3, 3, 5-trimethylcyclohexane,
- tert-butyl peroxyacetate,
- cumyl tert-butyl peroxide,
- tert-butyl peroxybenzoate,
- tert-butyl peroxy-2-ethylhexanoate.

The polymerization initiator can be present in a proportion of from 50 to 2000 ppm, based on the vinylaromatic monomer or monomers introduced.

The well-known phenomenon of phase inversion takes place during the polymerization, leading to the formation of particles (also called nodules) of rubber dispersed in a matrix of vinylaromatic polymer. During this polymerization, stirring must be sufficient for the dispersion of rubber particles to be uniform.

After polymerization, it is judicious to remove volatile species, such as the unreacted monomers and the organic solvent (if used). This can be done by conventional techniques, such as the use of a devolatizer which operates at elevated temperature and under vacuum.

The final content of rubber and of vinylaromatic copolymer or polymer in the composition according to the invention depends on the degree of progress of the polymerization, carried out before removal of the volatile species. In effect, if the degree of progress of the polymerization is low, the removal of the volatile species will result in the removal of a large amount of vinylaromatic monomer, and the final rubber content of the composition will be higher.

The progress of the polymerization can be monitored by virtue of samples taken during the polymerization step and by determining the solids content of the samples taken. By a solids content is meant the percentage by weight of solids obtained after evaporation under a vacuum of 25 millibars for approximately 20 minutes at 200° C. of the samples taken, relative to the initial weight of the sample taken. The polymerization can be continued, for example, until a solids content of between 60 and 80% by weight is obtained.

It is preferable to adjust the quantities of ingredients introduced and the preparation conditions so that the final composition contains between 2 and 25% rubber and, more preferably, between 4 and 15% rubber.

At the end of the polymerization, a composition is obtained which comprises a matrix of a vinylaromatic polymer surrounding particles of a rubber, the said composition likewise comprising a stable free radical and/or a group which generates a stable free radical, forming part of a polymer chain. In fact, the stable free radical may be in free form and/or in a form in which it is linked by a covalent bond to a polymer chain. In general, the propensity of a group which generates a stable free radical to liberate its stable free radical increases with temperature. The final composition is therefore more or less rich in stable free radical or group which generates a stable free radical, depending on the intensity of the devolatilization treatment carried out on the said composition and, likewise, depending on the nature of the stable free radical or of the group which generates a stable free radical. The devolatilization treatment is more intense, the longer its duration, and/or the higher its temperature, and/or the greater its vacuum.

The invention therefore makes it possible to obtain a composition comprising a matrix of vinylaromatic polymer surrounding particles of rubber at least some of which are in labyrinth form, the said composition comprising a stable free radical and/or a group which generates a stable free radical, forming part of a polymer chain.

The invention likewise makes it possible to obtain a composition comprising a vinylaromatic polymer matrix surrounding particles of rubber at least some of which are in onion form, the said composition comprising a stable free radical and/or a group which generates a stable free radical, forming part of a polymer chain.

The invention likewise makes it possible to obtain a composition comprising a vinylaromatic polymer matrix surrounding rubber particles at least some of which are in the form of capsules, the said composition comprising a stable free radical and/or a group which generates a stable free radical, forming part of a polymer chain, it being possible for the said capsules to constitute the morphology of at least 95% of the rubber particles.

In the examples which follow, the structure and properties of the compositions obtained were determined by the following techniques:

- rubber particle morphology: transmission electron microscopy on fine sections stained with osmium tetroxide,
- median size of the rubber particles: sedimentation granulometry (CAPA 700) after dissolution of the matrix in methyl ethyl ketone.

EXAMPLE 1 (COMPARATIVE)

A 2l glass reactor fitted with a stirrer system and a temperature control is charged at room temperature with 490 g of styrene, 168 g of ethylbenzene and 70 g of a styrene-butadiene block copolymer of trade name BL 6533, marketed by BAYER, the said copolymer comprising 40% by weight of units derived from styrene. Stirring is raised to 150 revolutions per minute.

After complete solubilization of the copolymer, the temperature is raised to 120° C. over 30 minutes and then is maintained at this temperature until a solids content of 60% is obtained, all the time with stirring. The contents of the reactor are then transferred to an oven at atmospheric pressure and with the ambient air in order to monitor the polymerization, first at 150° C. for 3 hours and then at 180° C. for 2 hours The properties of the composition obtained are indicated in Table 1. The great majority of the rubber particles, i.e., more than 95% of them, appear in the form of capsules.

EXAMPLE 2 (COMPARATIVE)

The same reactor as in Example 1 is charged at room temperature with 490 g of styrene, 168 g of ethylbenzene and 42 g of polybutadiene of trade name HX 527, marketed by BAYER. This polybutadiene has a weight-average molecular mass of 247,000 and a polydispersity of 2, and a Mooney viscosity ML (1+4) at 100° C. of 46.

Stirring is raised to 150 revolutions per minute.

After complete solubilization of the polybutadiene, 0.1488 g (i.e., $9.5 \times 10^{-4}$ mol) of 2,2,6,6-tetramethyl-1-piperidinyloxy (commonly called TEMPO) and 0.1848 g (i.e., $7.9 \times 10^{-4}$ mol) of O-tert-butyl-O-isopropyl monoperoxycarbonate, marketed by LUPEROX under the trade name TBIC-M75, are introduced at room temperature. The mixture is subsequently heated to 120° C. over 30 minutes and then is maintained at this temperature until a solids content of 60% is obtained, all the time with stirring. The contents of the reactor are then transferred to an oven at atmospheric pressure and with the ambient air in order to continue the polymerization, initially at 150° C. for 3 hours and then at 180° C. for 2 hours. The properties of the composition obtained are indicated in Table 1. The great majority of the rubber particles, i.e., more than 80% of them, appear in the form of salamis.

EXAMPLE 3

In the same reactor as in Example 1, 168 g of ethylbenzene and 42 g of polybutadiene HX 527 are introduced at room temperature. Stirring is raised to 150 revolutions per minute. Following complete solubilization of the polybutadiene, $9.5 \times 10^{-4}$ mol of TEMPO and $7.9 \times 10^{-4}$ mol of the peroxide TBIC-M75 are introduced and the reactor is heated at 120° C. for 2 hours with stirring at 50 revolutions per minute.

Then 490 g of styrene are added and the temperature is held at 120° C. until a solids content of 60% is obtained, with stirring at 150 revolutions per minute. Polymerization is continued in an oven as for the preceding examples. The properties of the composition obtained are indicated in Table 1. The great majority of the rubber particles, i.e., more than 95% of them, appear in the form of capsules.

TABLE 1

| | Example No. | | |
|---|---|---|---|
| | 1 | 2 | 3 |
| POLYBUTADIENE CONTENT (% BY WEIGHT) | 6 | 6 | 6 |
| MEDIAN SIZE OF NODULES (BY VOLUME) | 0.16 μm | 1.43 μm | 0.25 μm |
| MORPHOLOGY | capsules | salamis | capsules |

What is claimed is:

1. A process for preparing a rubber which carries a group which generates a stable free radical, including a step of heat treatment of an elastomer in the presence of a stable free radical, of a free-radical initiator which is capable of withdrawing a proton from the elastomer, and of a solvent and in the absence of vinylaromatic monomer, such that the rubber carries on average from 0.1 to 10 groups which generate a stable free radical per rubber chain.

2. The process according to claim 1, characterized in that the operating conditions of the heat treatment are such that the rubber carries on average from 0.5 to 2 groups which generate a stable free radical per rubber chain.

3. The process according to claim 2, characterized in that the operating conditions of the heat treatment are such that the rubber carries on average from 0.5 to 0.9 groups which generate a stable free radical per rubber chain.

4. The process according to claim 1, characterized in that the number (SFR) of moles of stable free radical, the number (INIT) of moles of free-radical initiator and the number (ELAST) of moles of elastomer are such that:

$$\frac{F_{INIT} \times (INIT)}{F_{SFR} \times (SFR)} \text{ is between 0.1 and 10,}$$

$$\frac{(ELAST)}{(SFR) \times F_{SFR}} \text{ is between 0.1 and 10,}$$

$F_{SFR}$ representing the functionality of the stable free radical, meaning the number of sites on the same stable free radical molecule which exhibit the stable free radical state, and $F_{INIT}$ representing the functionality of the free-radical initiator, meaning the number of free radicals which each molecule of initiator is capable of generating.

5. The process according to claim 1, characterized in that the temperature of the heat treatment is between ($T^{1/2}$–50° C.) and ($T^{1/2}$+50° C.), where $T^{1/2}$ represents the temperature for which the half-life of the initiator is one hour.

6. The process according to claim 1, characterized in that the heat treatment is carried out at between 50° C. and 150° C.

7. The process according to claim 1, characterized in that the elastomer is a homopolybutadiene.

8. The process according to claim 1, characterized in that the elastomer has a number-average molecular mass of from 50,000 to 350,000 and a weight-average molecular mass of from 100,000 to 500,000.

9. Rubber obtained by the process of claim 1.

10. Rubber according to claim 9, characterized in that it is obtained from a polybutadiene which has been modified to give it a group which generates a stable free radical.

11. Rubber, comprising on average from 0.1 to 0.9 groups which generate stable free radicals per rubber chain.

12. Rubber according to claim 11, characterized in that it is obtained from a polybutadiene which has been modified to give it a group which generates a stable free radical.

13. A process for preparing a composition comprising a vinylaromatic polymer matrix and particles of rubber, comprising a step of polymerizing at least one vinylaromatic monomer in the presence of a rubber which, prior to the polymerization, carries a group which generates a stable free radical, wherein the rubber is the rubber of claim 9, and at least some of the particles of rubber are in labyrinth form, onion form or capsule form, and wherein the rubber, prior to the polymerization, carries on average from 0.1 to 0.9 groups which generate stable free radicals per rubber claim.

14. The process according to claim 13 characterized in that the polymerization is initiated thermally, without either initiator or catalyst, and is carried out at between 100 and 200° C.

15. The process according to claim 13, characterized in that the polymerization is carried out at between 90 and 160° C. in the presence of a polymerization initiator.

16. The process according to claim 13, characterized in that at least one vinylaromatic monomer is styrene.

17. The process according to claim 13, characterized in that at least 95% of the rubber particles are in capsule form.

18. Composition comprising a matrix of vinylaromatic polymer surrounding particles of rubber and comprising a stable free radical and/or a group which generates a stable free radical, forming part of a polymer chain, characterized in that at least some of the rubber particles are in labyrinth form.

19. Composition comprising a matrix of vinylaromatic polymer surrounding particles of rubber and comprising a stable free radical and/or a group which generates a stable free radical, forming part of a polymer chain, characterized in that at least some of the rubber particles are in onion form.

20. Composition comprising a matrix of vinylaromatic polymer surrounding particles of rubber and comprising a stable free radical and/or a group which generates a stable free radical, forming part of a polymer chain, characterized in that at least some of the rubber particles are in capsule form.

21. Composition comprising a matrix of vinylaromatic polymer surrounding particles of rubber and comprising a stable free radical and/or a group which generates a stable free radical, forming part of a polymer chain, characterized in that at least 95% of the rubber particles are in capsule form.

22. Composition according to any one of claims 18 to 21, characterized in that the vinylaromatic polymer is polystyrene.

23. Composition according to any one of claims 18 to 21, characterized in that the rubber is a homopolybutadiene.

24. A process for preparing a rubber which carries a group which generates a stable free radical, including a step of heat treatment of an elastomer in the presence of a stable free radical, of a free-radical initiator which is capable of withdrawing a proton from the elastomer, and of a solvent and in the absence of vinylaromatic monomer, such that the rubber carries on average from 0.1 to 0.9 groups which generate a stable free radical per rubber chain, wherein the number (SFR) of moles of stable free radical, the number (INIT) of moles of free-radical initiator and the number (ELAST) of moles of elastomer are such that:

$$\frac{F_{INIT} \times (INIT)}{F_{SFR} \times (SFR)} \text{ is between 0.1 and 10,}$$

$$\frac{(ELAST)}{(SFR) \times F_{SFR}} \text{ is between 0.1 and 10,}$$

$F_{SFR}$ representing the functionality of the stable free radical, meaning the number of sites on the same stable free radical molecule which exhibit the stable free radical state, and $F_{INIT}$ representing the functionality of the free-radical initiator, meaning the number of free radicals which each molecule of initiator is capable of generating, and the elastomer has a number-average molecular mass of from 50,000 to 350,000 and a weight-average molecular mass of from 100,000 to 500,000, and the elastomer is a homopolybutadiene.

25. Rubber obtained by the process of claim 24.

26. A process for preparing a composition comprising a vinylaromatic polymer matrix and particles of rubber, comprising a step of polymerizing at least one vinylaromatic monomer in the presence of a rubber which, prior to the polymerization, carries a group which generates a stable free radical, wherein the rubber is the rubber of claim 25, and at least some of the particles of rubber are in labyrinth form, onion form or capsule form.

27. The process according to claim 26, wherein at least 95% of the rubber particles are in capsule form.

28. A process for preparing a composition comprising a vinylaromatic polymer matrix and particles of rubber, comprising a step of polymerizing at least one vinylaromatic monomer in the presence of a rubber which, prior to the said polymerization, carries a group which generates a stable free radical, wherein the rubber is the rubber of claim 13, and at least some of the particles of rubber are in labyrinth form or onion form or capsule form.

29. The process according to claim 28, wherein at least 95% of the rubber particles are in capsule form.

* * * * *